United States Patent
Wong et al.

(10) Patent No.: US 10,011,348 B1
(45) Date of Patent: Jul. 3, 2018

(54) VERTICAL THRUST LEVER

(71) Applicant: Kitty Hawk Corporation, Mountain View, CA (US)

(72) Inventors: Sheldon Wong, San Francisco, CA (US); William C. Shoemaker, Campbell, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 0 days.

(21) Appl. No.: 15/584,916

(22) Filed: May 2, 2017

(51) Int. Cl.
*B64C 13/14* (2006.01)
*B64C 29/00* (2006.01)

(52) U.S. Cl.
CPC .......... *B64C 13/14* (2013.01); *B64C 29/0025* (2013.01)

(58) Field of Classification Search
CPC ......... B64C 13/14; B64C 13/12; B64C 13/04; B64C 29/0025; B64C 19/02; B64C 19/00
USPC ................................................ 244/12.3, 234
See application file for complete search history.

(56) References Cited

U.S. PATENT DOCUMENTS

| | | | | |
|---|---|---|---|---|
| 2,791,664 A * | 5/1957 | Rohacs | ................... | B64C 13/04 200/304 |
| 3,403,734 A * | 10/1968 | Herrmann | ............... | B64C 27/18 244/17.11 |
| 4,130,259 A * | 12/1978 | Carlson | ................... | B64C 27/56 244/234 |
| 4,420,808 A * | 12/1983 | Diamond | ............. | B60N 2/4693 244/177 |
| 4,887,782 A * | 12/1989 | Carnell | ................... | B64C 27/56 244/234 |
| 4,901,952 A * | 2/1990 | Curtis | ..................... | B64D 31/04 244/23 D |
| 5,472,156 A * | 12/1995 | Bivens, III | .............. | B64C 13/04 244/229 |
| 5,853,152 A * | 12/1998 | Evans | ..................... | B64C 13/04 244/221 |
| 8,240,617 B2 * | 8/2012 | Biest | ....................... | B64C 27/26 244/17.13 |
| 8,844,880 B1 * | 9/2014 | Corliss | .................... | B64C 27/48 244/229 |
| 9,126,677 B1 * | 9/2015 | Curtis | ..................... | B64C 19/00 |
| 9,767,659 B2 * | 9/2017 | Provancher | ............. | G08B 6/00 |
| 2003/0094537 A1 * | 5/2003 | Austen-Brown | ....... | B64C 27/28 244/7 R |
| 2009/0045294 A1 * | 2/2009 | Richardson | ............. | B64C 3/385 244/7 A |
| 2009/0283644 A1 * | 11/2009 | Haverdings | ............. | B64C 13/04 244/7 C |
| 2009/0302170 A1 * | 12/2009 | Rozovski | ................ | B64C 13/04 244/221 |
| 2012/0168568 A1 * | 7/2012 | Sonneborn | .............. | B64C 27/26 244/7 R |

(Continued)

*Primary Examiner* — Christopher P Ellis
(74) *Attorney, Agent, or Firm* — Van Pelt, Yi & James LLP (57) ABSTRACT

A vertical thrust lever has a first range of motion and is configured to output a first signal level where the first signal level is based at least in part on the position of the vertical thrust lever and the first signal level is used to control a first set of rotors which rotate in a horizontal plane. A controller has a second range of motion and is configured to output a second signal level where the second signal level is based at least in part on the position of the controller and the second signal level is used to control a second set of rotors which rotate in a vertical plane.

17 Claims, 6 Drawing Sheets

(56) References Cited

U.S. PATENT DOCUMENTS

| | | | | |
|---|---|---|---|---|
| 2014/0021303 A1* | 1/2014 | Salamat | ............... | B64C 13/04 |
| | | | | 244/231 |
| 2014/0353433 A1* | 12/2014 | Gemmati | ............... | B64C 13/04 |
| | | | | 244/234 |
| 2015/0202540 A1* | 7/2015 | Erhart | ............... | A63H 30/04 |
| | | | | 340/12.5 |
| 2015/0246723 A1* | 9/2015 | Milad | ............... | B64C 13/14 |
| | | | | 244/234 |
| 2016/0236775 A1* | 8/2016 | Eshkenazy | ............... | B64C 29/0025 |
| 2016/0375996 A1* | 12/2016 | Modrzejewski | ............... | B64C 27/57 |
| | | | | 244/228 |
| 2017/0021939 A1* | 1/2017 | Crosta | ............... | B64D 43/00 |
| 2017/0113783 A1* | 4/2017 | Scofield | ............... | B64C 13/04 |

\* cited by examiner

VERTICAL THRUST LEVER

BACKGROUND OF THE INVENTION

Traditional types of aircraft tend to be optimized for either forward (e.g., horizontal) flight or vertical flight, but not both. For example, helicopters tend to be efficient and/or good at flying vertically. They can hover at a constant altitude and can also ascend or descend substantially vertically in a relatively efficient manner (e.g., as measured by power consumption). However, helicopters tend to be inefficient when flying forwards at a constant altitude. In contrast, airplanes (with aerodynamic lift forces acting on the wings of the airplanes) tend to be good at forward flight, but cannot hover or ascend/descend substantially vertically. New types of aircraft are being developed which are good at both forward flight and vertical flight. As a result, it would be desirable for new controllers for piloting these new types of aircraft to be developed because existing controllers may not be optimized for this new manner of flying.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a vertical thrust lever are described herein. First, an example of a multicopter which is piloted using a vertical thrust lever is described. Then, various vertical thrust lever embodiments are described, including an example showing how a vertical thrust lever may be connected and/or mounted to the rest of the aircraft. For example, the controller may be a thumb slider which controls a left tail rotor and right tail rotor in a combined mode (e.g., where the two tail rotors output the same thrust) or a differential mode (e.g., where the two tail rotors output thrusts with different signs (e.g., positive and negative) but possibly the same magnitude).

Figure 1:
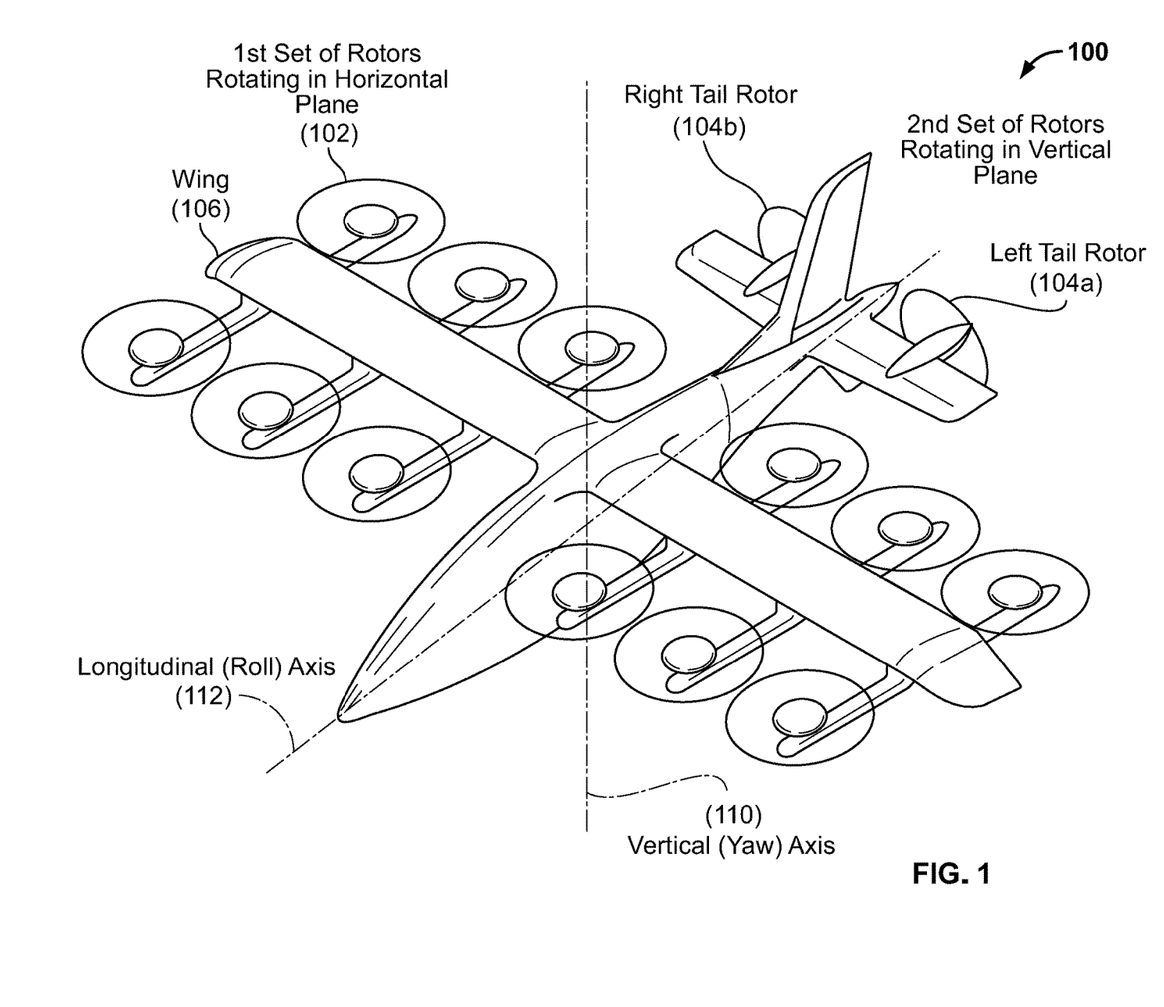
FIG. 1 is a diagram illustrating an embodiment of a multicopter which is controlled using a vertical thrust lever.

FIG. 1 is a diagram illustrating an embodiment of a multicopter which is controlled using a vertical thrust lever. In the example shown, the multicopter is a manned multicopter with two sets of rotors where at least some of the rotors are controlled using a vertical thrust lever (not shown). The rotors in the first set (102) are oriented to rotate in a horizontal plane. Generally speaking, these rotors are optimized for vertical thrust. For example, the blades of rotors 102 are positioned to be at a relatively flat pitch angle in order to provide better vertical lift, which makes rotors 102 efficient and/or good at hovering or ascending/descending substantially vertically into the air. These rotors (102) are sometimes referred to as a vertical propulsion system.

The second set of rotors (including left tail rotor 104a and right tail rotor 104b) are oriented to rotate in a vertical plane. Generally speaking, these rotors in the second set are optimized for forward flight. For example, the blades of the rotors in the second set may have their blades at a steeper pitch angle which is better for propelling the multicopter forward through the air (e.g., nose first) where lift comes from the airflow over the wings (106). These rotors (104a and 104b) are sometimes referred to as a horizontal propulsion system.

It may be helpful to describe an example flight from takeoff to landing to illustrate how and when the two sets of rotors may be used. At takeoff, the exemplary multicopter primarily uses the first set of rotors (102) to obtain the necessary lift. In this example, the multicopter takes off by ascending substantially vertically from the ground (e.g., like a helicopter). In some embodiments, the multicopter may be slightly "nose up" on the ground and the second set of rotors may be rotating at a relatively slow or moderate speed (e.g., while on the ground) in order to tilt the multicopter slightly forward in order to level off the multicopter before taking off. Alternatively, the second set of rotors may be off and the multicopter may take off using only the first set of rotors.

Once the multicopter has reached a desired altitude, the multicopter (at least in this example) transitions to a forward flight mode. For example, the pilot may stop the ascent of the multicopter (e.g., by using a vertical lift lever to make the first set of rotors (102) output zero thrust) and hover the multicopter at a constant position in air. With the first set of rotors (102) on and providing the necessary lift to keep the multicopter airborne, the second set of rotors (104a and 104b) may be turned on (if not already on) and sped up so that the multicopter begins to move forward (e.g., nose first). Once the multicopter is moving forward at a sufficiently high rate of speed (e.g., so that there is sufficient aerodynamic lift on the wings), the first set of rotors may be turned off. The first set of rotors are optimized for vertical thrust (e.g., hovering or vertically ascending/descending) and it may be more efficient to turn off the first set of rotors when the multicopter is flying forwards at a relatively constant altitude (e.g., the multicopter may be battery-powered and turning off the first set of motors may conserve power).

To land, the first set of rotors (102) are turned back on to provide (e.g., additional) vertical thrust for the aircraft. The aircraft may then land by descending substantially vertically (e.g., where the second set of rotors are turned off) or the aircraft may follow a diagonal flight path (e.g., where both the first set of rotors and the second set of rotors provide a meaningful amount of lift to land the aircraft).

The following figures show various embodiments of vertical lift levers.

Figure 2:
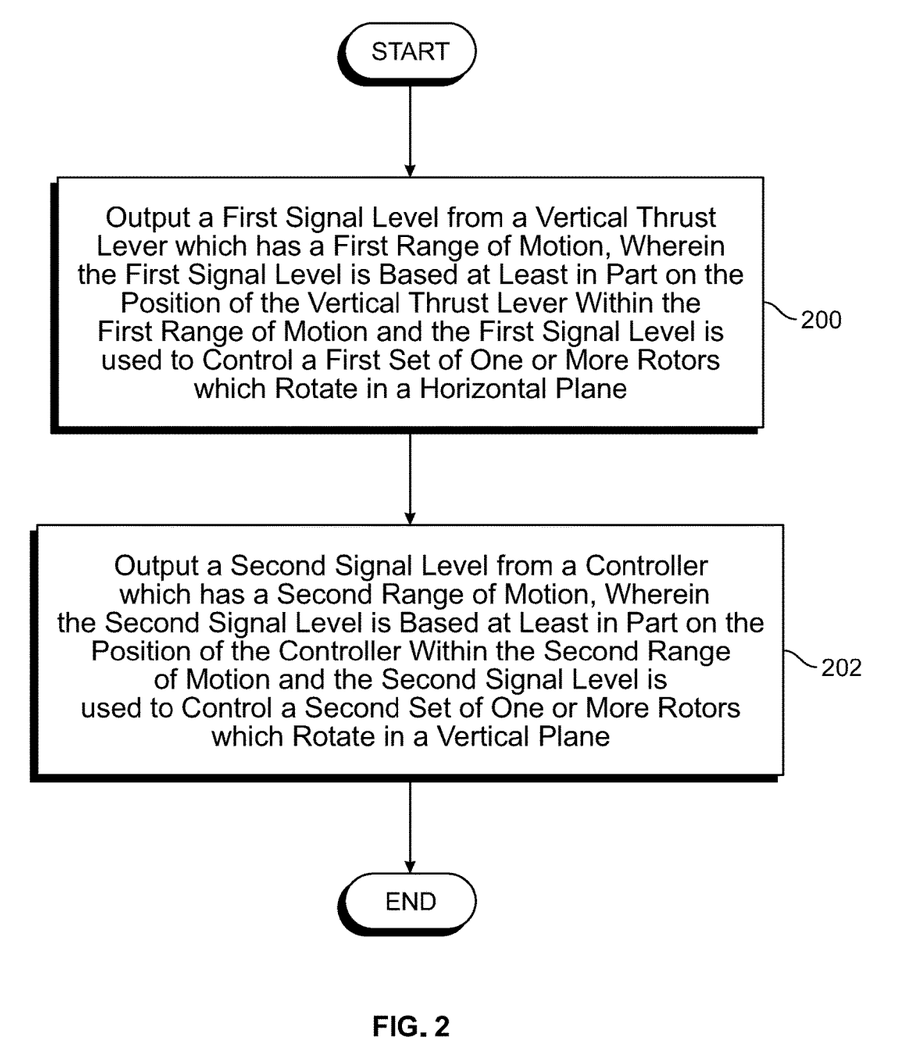
FIG. 2 is a flowchart illustrating an embodiment of a process to output two signal levels which are used to respectively control two sets of rotors.

FIG. 2 is a flowchart illustrating an embodiment of a process to output two signal levels which are used to respectively control two sets of rotors. In some embodiments, the vertical thrust lever and the controller (e.g., a thumb slider, a horizontal thrust controller, etc.) are operated simultaneously.

At 200, a first signal level is output from a vertical thrust lever which has a first range of motion, wherein the first signal level is based at least in part on the position of the vertical thrust lever within the first range of motion and the first signal level is used to control a first set of one or more rotors which rotate in a horizontal plane. For example, step 200 may be performed by a vertical thrust lever which outputs an electrical signal where the voltage of the signal indicates or otherwise corresponds to the position of the vertical thrust lever. This electrical signal may be received by a flight computer or flight controller which in turns adjusts the thrust(s) of corresponding rotors accordingly based on the signal level (e.g., voltage level).

In one example, when the vertical thrust lever is positioned to be relatively forward or down (e.g., within the range of motion), the first set of rotors may produce negative vertical thrust. When the lever is positioned to be relatively back or up, the first set of rotors may produce negative vertical thrust. Between those two ranges, there may be a position where the corresponding rotors (e.g., 102 in FIG. 1) output zero vertical thrust.

At 202, a second signal level is output from a controller which has a second range of motion, wherein the second signal level is based at least in part on the position of the controller within the second range of motion and the second signal level is used to control a second set of one or more rotors which rotate in a vertical plane. In one example, step 202 is performed by a controller which is a combined axial thrust slider which is configured to control the second set of rotors such that a left (tail) rotor and a right (tail) rotor produce matching thrusts (e.g., with the same sign and same magnitude). Such a combined axial thrust slider may be a fore-aft thumb slider which in some embodiments may in turn include one or more detents.

In some embodiments, the controller is a differential axial thrust slider which is configured to control the second set of rotors such that a left tail rotor and a right tail rotor produce thrusts with opposite signs (e.g., so that the aircraft rotates about a vertical axis). In some embodiments, the magnitudes are the same. A differential axial thrust slider may be a left-right thumb slider and in some embodiments may include one or more detents.

Similar to the first signal level, the second signal level output at step 202 may be an electrical signal where the voltage level of the signal corresponds to or otherwise indicates the position of the controller. The second signal level may be input by a flight computer or flight controller which adjusts the thrust(s) of the second set of rotors accordingly.

The following figures show some embodiments of a vertical thrust lever. It is noted that the exemplary hand controls described herein may be used to control a variety of aircraft and are not limited to the multicopter shown in FIG. 1 (e.g., vertical and/or horizontal thrust may come from a variety of sources such as rotors, propellers, jets, etc.).

Figure 3:
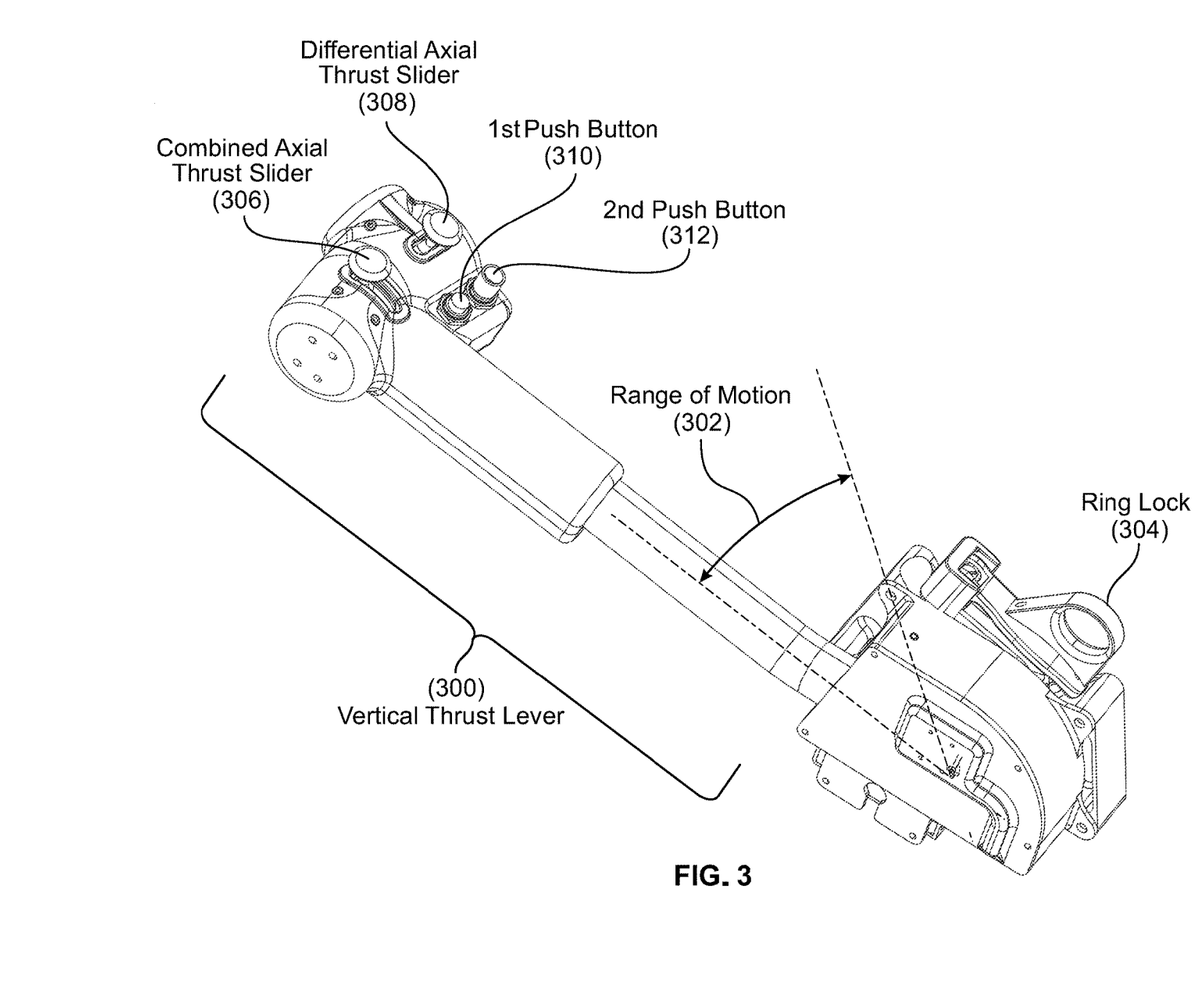
FIG. 3 is a diagram illustrating an embodiment of a vertical thrust lever with a ring lock and two axial thrust sliders.

FIG. 3 is a diagram illustrating an embodiment of a vertical thrust lever with a ring lock and two axial thrust sliders. It is noted that the range of thrust values described in this figure and other examples (e.g., controlled using a vertical thrust lever, a combined axial thrust slider, a differential axial thrust slider, etc.) are merely exemplary and are not intended to be limiting. For example, although some examples may describe thrust ranges which include negative values, in some embodiments a rotor cannot produce a negative thrust (e.g., the possible thrust outputs range from zero to some positive, maximum value).

In the example shown, the vertical thrust lever (300) controls the amount of vertical thrust coming from a set of one or more rotors which rotate in a horizontal plane (e.g., rotors 102 in FIG. 1). The vertical thrust lever has a range of motion (302) which is shown using dashed lines. When the vertical thrust lever is in the position shown here (e.g., down/forward, at one end of the range of motion), the corresponding rotors output a minimum vertical thrust (e.g., rotors 102 in FIG. 1 stop and are not rotating). When the vertical thrust lever (300) is at the other end of the range of motion (e.g., up/backward, not shown here), the corresponding rotors output a maximum vertical thrust. For example, this may cause rotors 102 in FIG. 1 to rotate at a maximum rotational speed.

In some embodiments, a vertical thrust lever has a detent which corresponds to zero vertical thrust. When the vertical thrust lever is at this detent, the corresponding rotors (e.g., 102 in FIG. 1) output zero vertical thrust. In one example, this zero vertical thrust corresponds to the position show here (i.e., the vertical thrust lever is all the forwards/down). As described above, the pilot may have the vertical thrust lever in this zero vertical thrust detent when flying forward at a constant altitude (e.g., the horizontal propulsion system is able to keep the multicopter airborne).

In this example there is a ring lock (304) which may be used to lock the vertical thrust lever when the vertical thrust lever is sitting in the zero thrust detent. In this example, the lock is shaped like a ring and is designed to wrap around the vertical thrust lever. The lock enables the pilot to let go of the vertical thrust lever (e.g., with the multicopter hovering at a constant altitude) and do other things without worrying about the vertical thrust lever slipping and/or being accidentally shifted by the pilot's knee or other body part. For example, the pilot may wish to visually survey his/her surroundings, interact with some touchscreen interface, etc. This type of lock is merely exemplary and any appropriate lock may be used.

In some embodiments, a vertical thrust lever is configured to have adjustable friction. For example, different pilots prefer different haptic experiences when piloting an aircraft and offering adjustable friction permits pilots to adjust the "feel" of the vertical thrust lever to their liking.

One benefit of a vertical thrust lever (one embodiment of which is shown here) is that levers tend to offer better control compared to (as an example) thumb sliders. Also, for multicopters like that shown in FIG. 1, movement in the vertical direction is the most important to get right. At high airspeeds, an accidental vertical thrust command could result in structural damage or failure, for example to some structure connecting the fuselage to the motor(s). By using a lever to control vertical thrust (e.g., as opposed to other types of controls, like a thumb lever), inadvertent vertical thrust inputs can be avoided or at least mitigated because levers tend to have a larger range of motion compared to thumb sliders (e.g., so the same amount of accidental displacement in a lever versus a thumb slider results in less accidental thrust change) and thumb sliders require more fine motor skills compared to levers. With a small thumb slider, large vertical changes could occur if the pilot's finger were to slip. In other words, a vertical thrust lever may prevent (or at least mitigate) inadvertent changes in the vertical thrust.

Attached to the vertical thrust lever (300) is a combined axial thrust slider (306) which controls the rotors which rotate in a vertical plane in a combined mode or manner. For example, using this slider, both left tail rotor 104a and right tail rotor 104b in FIG. 1 will output the same amount of thrust. In this example, slider 306 is a fore-aft thumb slider where the slider can move forwards or backwards. When the combined axial thrust slider in the position shown here (i.e., with the slider all the way forward), both the left tail rotor and the right tail rotor will output the maximum longitudinal thrust. For example, this would cause the corresponding rotors (e.g., 104a and 104b in FIG. 1) to rotate at a maximum speed. When the combined axial thrust slider is slid all the way back, the two tail rotors will output a minimum longitudinal thrust. For example, in FIG. 1, this may correspond to rotors 104a and 104b stopping. It is noted that the first set of rotors (102 in FIG. 1) may be on to provide lift (if needed) when switching from negative to positive longitudinal thrust or vice versa.

In some embodiments, the combined axial thrust slider (306) has a detent which indicates or otherwise corresponds to a recommended sustained maximum, where it is recommended that the aircraft not be operated for sustained and/or relatively long periods of time beyond the position of the detent. For example, although the combined axial thrust slider may be pushed all the way forward for short periods of time (e.g., so that for a short period of time, the aircraft has maximum forward or longitudinal thrust), operating the aircraft in that state for a prolonged period of time may cause too much current draw, which in turn demagnetizes the magnets in the motors (e.g., which power rotors 102, 104a, and/or 104b in FIG. 1). It may also be undesirable to hold the combined axial thrust slider all the way forward for long periods of time because it will quickly drain the battery.

In some embodiments, the combined axial thrust slider (306) has a (e.g., second) detent which corresponds to zero longitudinal thrust. For example, if the pilot wanted no movement either forwards or backwards along the longitudinal axis (112 in FIG. 1), the pilot would put the combined axial thrust slider into this detent.

To operate the left tail rotor and right tail rotor in a differential mode, the differential axial thrust slider (308) may be used. The differential axial thrust slider is implemented in this example using a left-right thumb slider. The position of the differential axial thrust slider generally corresponds to the direction the multicopter rotates about the vertical axis (110 in FIG. 1). For example, if the differential axial thrust slider is pushed to the right, the multicopter rotates clockwise about vertical axis 110 in FIG. 1 (e.g., looking down on the multicopter). This corresponds to the right tail rotor (104b) outputting a negative thrust and the left tail rotor (104a) outputting a positive thrust. The magnitude of the thrust naturally corresponds to the displacement of the slider. Similarly, if the differential axial thrust slider is pushed to the left, the multicopter rotates counterclockwise about vertical axis 110 in FIG. 1 (e.g., looking down on the multicopter) with the right tail rotor (104b) outputting a positive thrust and the left tail rotor (104a) outputting a negative thrust. In some embodiments, the differential axial thrust slider has a detent at this zero thrust position.

Another benefit to vertical thrust levers (one embodiment of which is shown here) is that they offer a combination of controls not typically offered. For example, helicopters typically have physical and/or hand controllers in the cockpit to control vertical thrust, pitch rotation, roll rotation, and yaw rotation. Airplanes typically have physical and/or hand controllers in the cockpit to control horizontal thrust, pitch rotation, roll rotation, and yaw rotation. In the example shown here, control of both vertical thrust (e.g., using vertical thrust lever (300)) and horizontal thrust (e.g., using combined axial thrust slider (306) and/or differential axial thrust slider (308)) is available.

In this example, the combined axial thrust slider (306) includes two momentary push buttons. The first push button (310) acts as a clear button to clear messages or warnings (not shown) displayed to the pilot. For example, there may be some display in the cockpit in which messages or warnings are displayed and pushing button 310 may clear one or more of those messages. In one example, each button push clears one message (e.g., so the pilot has an opportunity to view all messages if multiple messages arrive simultaneously or have stacked up over time).

The second push button (312) in this example is used as an event marker. For example, pushing this button may cause the GPS coordinates of the multicopter's current position to be stored, along with a timestamp. Other examples of events and/or information recorded include if the pilot senses abnormal vibration or sounds, the event marker can be used to record information during that event, such as an audio recording, the current state of the aircraft, etc.

The following figure illustrates how a vertical thrust lever may be connected to the rest of the multicopter.

Figure 4:
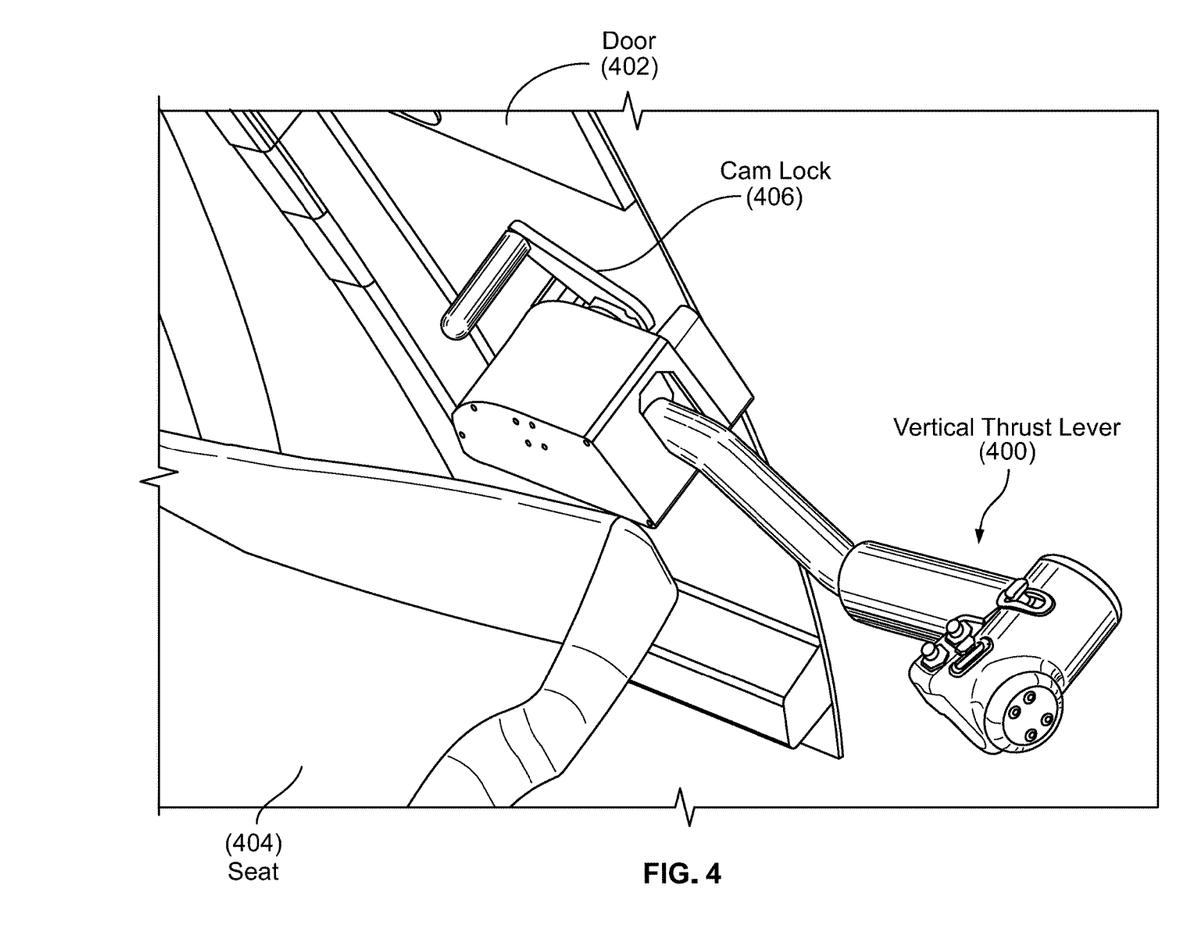
FIG. 4 is a diagram illustrating an embodiment of a door-mounted vertical thrust lever.

FIG. 4 is a diagram illustrating an embodiment of a door-mounted vertical thrust lever. In the example shown, a vertical thrust lever (400) is connected or otherwise mounted to the door (402) of the multicopter's fuselage. The seat (404) is also shown here to more clearly provide context and show that (in this example at least) the vertical thrust lever is positioned to be operated using the pilot's left hand.

In some embodiments, it is desirable for the lever to be door-mounted (as shown here) instead of floor-mounted because it leaves more leg room for the pilot, which is more comfortable for the pilot. A door-mounted vertical thrust lever may also be attractive if the pilot needs to evacuate the aircraft during an emergency. In some embodiments, the door will jettison (with the vertical thrust lever attached) which permits an unobstructed path out of the aircraft. In other words, the vertical thrust lever will not block the pilot during an emergency exit.

Figure 5:
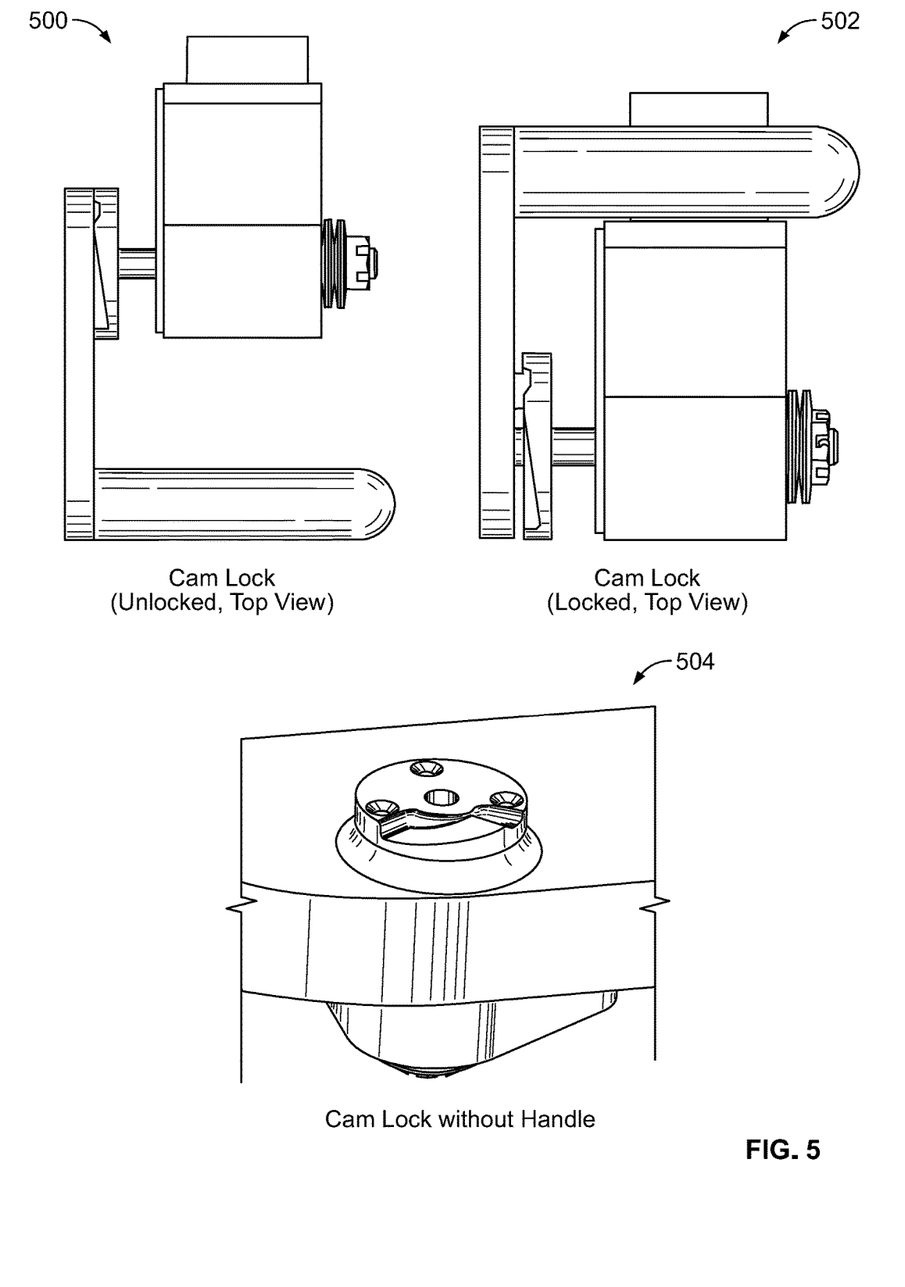
FIG. 5 is a diagram illustrating an embodiment of a cam lock.

This vertical thrust lever embodiment includes a cam lock (406). The following figure shows this cam lock in more detail.

FIG. 5 is a diagram illustrating an embodiment of a cam lock. In this example, diagram 500 shows a top view of the cam lock when unlocked. Diagram 502 shows a top view of the cam lock when locked. Diagram 504 shows the cam lock without the handle attached.

The selection of a lock is application and/or aircraft dependent and one type of lock may be good for certain types of applications and/or aircrafts but undesirable for others. Ring locks (such as the one shown in FIG. 4) may take up less space and be attractive for applications and/or fuselages where space is at a premium. Cam locks (such as the one shown here) may be easier to lock/unlock and may be desirable for applications and/or aircrafts where one-handed and/or easier locking/unlocking is desired.

The following figure shows another example of a vertical thrust lever.

Figure 6:
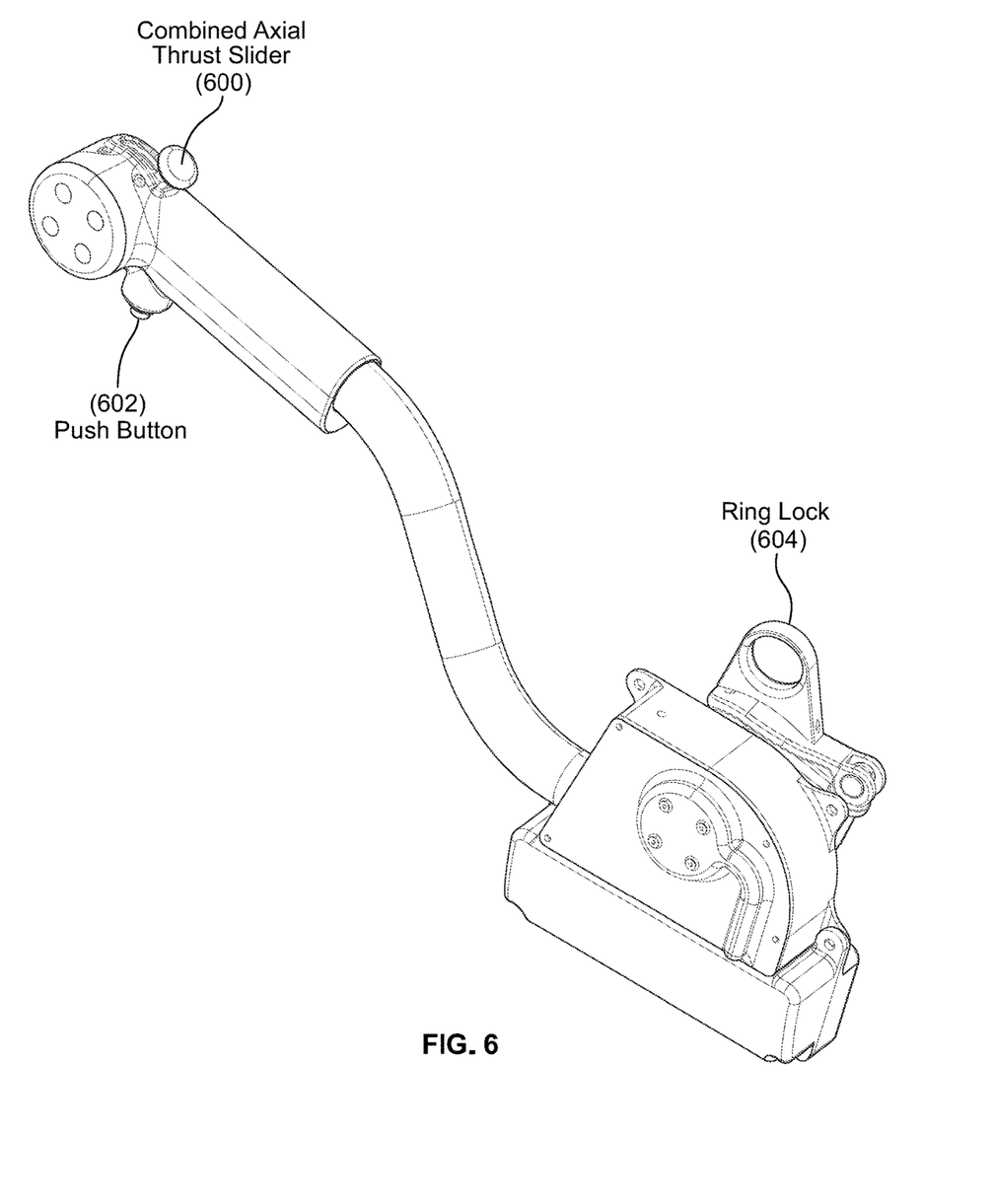
FIG. 6 is a diagram illustrating an embodiment of a vertical thrust lever with a ring lock and a single axial thrust slider.

FIG. 6 is a diagram illustrating an embodiment of a vertical thrust lever with a ring lock and a single axial thrust slider. In this example, there is no differential axial thrust slider attached to the vertical thrust lever, only a combined axial thrust slider (600). Also, instead of two momentary push buttons, there is only one momentary push button (602) and it is located on the underside of the vertical thrust lever, not the top surface as is shown in FIG. 3. In various embodiments, push button 602 may be a clear button or an event marker. In this example, there is also a ring lock (604) to lock the vertical thrust lever, if desired.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a vertical thrust lever which has a first range of motion and which is configured to output a first signal level, wherein the first signal level is based at least in part on the position of the vertical thrust lever within the first range of motion and the first signal level is used to control a first set of one or more rotors which rotate in a horizontal plane; and
    a thumb controller which is coupled to the vertical thrust lever, which has a second range of motion, and which is configured to output a second signal level, wherein:
    the second signal level is based at least in part on the position of the thumb controller within the second range of motion and the second signal level is used to control a second set of one or more rotors which rotate in a vertical plane;
    the position of the thumb controller is independent of the position of the vertical thrust lever; and
    the thumb controller is configured to control the second set of rotors such that:
    in a combined mode, the second set of rotors outputs a first thrust output and a second thrust output that are matching; and
    in a differential mode, the second set of rotors outputs a third thrust output and a fourth thrust output with opposite signs.

2. The system recited in claim 1, wherein the vertical thrust lever includes a detent associated with zero thrust.

3. The system recited in claim 1, wherein:
    the vertical thrust lever includes a detent associated with zero thrust; and
    the system further includes a lock which is configured to lock the vertical thrust lever at the detent associated with zero thrust.

4. The system recited in claim 1, wherein:
    the vertical thrust lever includes a detent associated with zero thrust; and
    the system further includes a lock which is configured to lock the vertical thrust lever at the detent associated with zero thrust, wherein the lock includes a ring lock.

5. The system recited in claim 1, wherein:
    the vertical thrust lever includes a detent associated with zero thrust; and
    the system further includes a lock which is configured to lock the vertical thrust lever at the detent associated with zero thrust, wherein the lock includes a cam lock.

6. The system recited in claim 1, wherein:
    the second set of rotors includes a left rotor and a right rotor; and
    the thumb controller includes a combined axial thrust thumb slider which is configured to control the second set of rotors such that in the combined mode, the left rotor and the right rotor respectively produce the first thrust output and the second thrust output that are matching thrusts.

7. The system recited in claim 1, wherein:
    the second set of rotors includes a left rotor and a right rotor;
    the thumb controller includes a combined axial thrust thumb slider which is configured to control the second set of rotors such that in the combined mode, the left rotor and the right rotor respectively produce the first thrust output and the second thrust output that are matching thrusts; and
    the combined axial thrust thumb slider includes a fore-aft thumb slider.

8. The system recited in claim 1, wherein:
    the second set of rotors includes a left rotor and a right rotor;
    the thumb controller includes a combined axial thrust thumb slider which is configured to control the second set of rotors such that in the combined mode, the left rotor and the right rotor respectively produce the first thrust output and the second thrust output that are matching thrusts; and
    the combined axial thrust thumb slider includes a fore-aft thumb slider which in turn includes a detent associated with zero thrust.

9. The system recited in claim 1, wherein:
    the second set of rotors includes a left rotor and a right rotor;
    the thumb controller includes a combined axial thrust thumb slider which is configured to control the second set of rotors such that in the combined mode, the left rotor and the right rotor respectively produce the first thrust output and the second thrust output that are matching thrusts; and
    the combined axial thrust thumb slider includes a fore-aft thumb slider which in turn includes a detent associated with a recommended sustained maximum.

10. The system recited in claim 1, wherein:
    the second set of rotors includes a left rotor and a right rotor; and
    the thumb controller includes a differential axial thrust thumb slider which is configured to control the second set of rotors such that in the differential mode, the left rotor and the right rotor respectively produce the third thrust output and the fourth thrust output with opposite signs.

11. The system recited in claim 1, wherein:
the second set of rotors includes a left rotor and a right rotor;
the thumb controller includes a differential axial thrust thumb slider which is configured to control the second set of rotors such that in the differential mode, the left rotor and the right rotor respectively produce the third thrust output and the fourth thrust output with opposite signs; and
the differential axial thrust thumb slider includes a left-right thumb slider.

12. The system recited in claim 1, wherein:
the second set of rotors includes a left rotor and a right rotor;
the thumb controller includes a differential axial thrust thumb slider which is configured to control the second set of rotors such that in the differential mode, the left rotor and the right rotor respectively produce the third thrust output and the fourth thrust output with opposite signs; and
the differential axial thrust thumb slider includes a left-right thumb slider which in turn includes a detent associated with zero thrust.

13. The system recited in claim 1, further comprising a momentary push button which is configured to clear at least one displayed message.

14. The system recited in claim 1, further comprising a momentary push button which is configured to mark an event.

15. The system recited in claim 1, further comprising a momentary push button which is configured to mark an event, including by storing current coordinates.

16. The system recited in claim 1, wherein the vertical thrust lever is door-mounted.

17. A method, comprising:
outputting a first signal level from a vertical thrust lever which has a first range of motion, wherein the first signal level is based at least in part on the position of the vertical thrust lever within the first range of motion and the first signal level is used to control a first set of one or more rotors which rotate in a horizontal plane; and
outputting a second signal level from a thumb controller which is coupled to the vertical thrust lever and which has a second range of motion, wherein:
the second signal level is based at least in part on the position of the thumb controller within the second range of motion and the second signal level is used to control a second set of one or more rotors which rotate in a vertical plane;
the position of the thumb controller is independent of the position of the vertical thrust lever; and
the thumb controller is configured to control the second set of rotors such that:
in a combined mode, the second set of rotors outputs a first thrust output and a second thrust output that are matching; and
in a differential mode, the second set of rotors outputs a third thrust output and a fourth thrust output with opposite signs.

* * * * *